March 1, 1927.
A. P. ARMINGTON
1,619,175
AUXILIARY RIM AND MEANS FOR ATTACHING SAME
Filed March 24, 1926
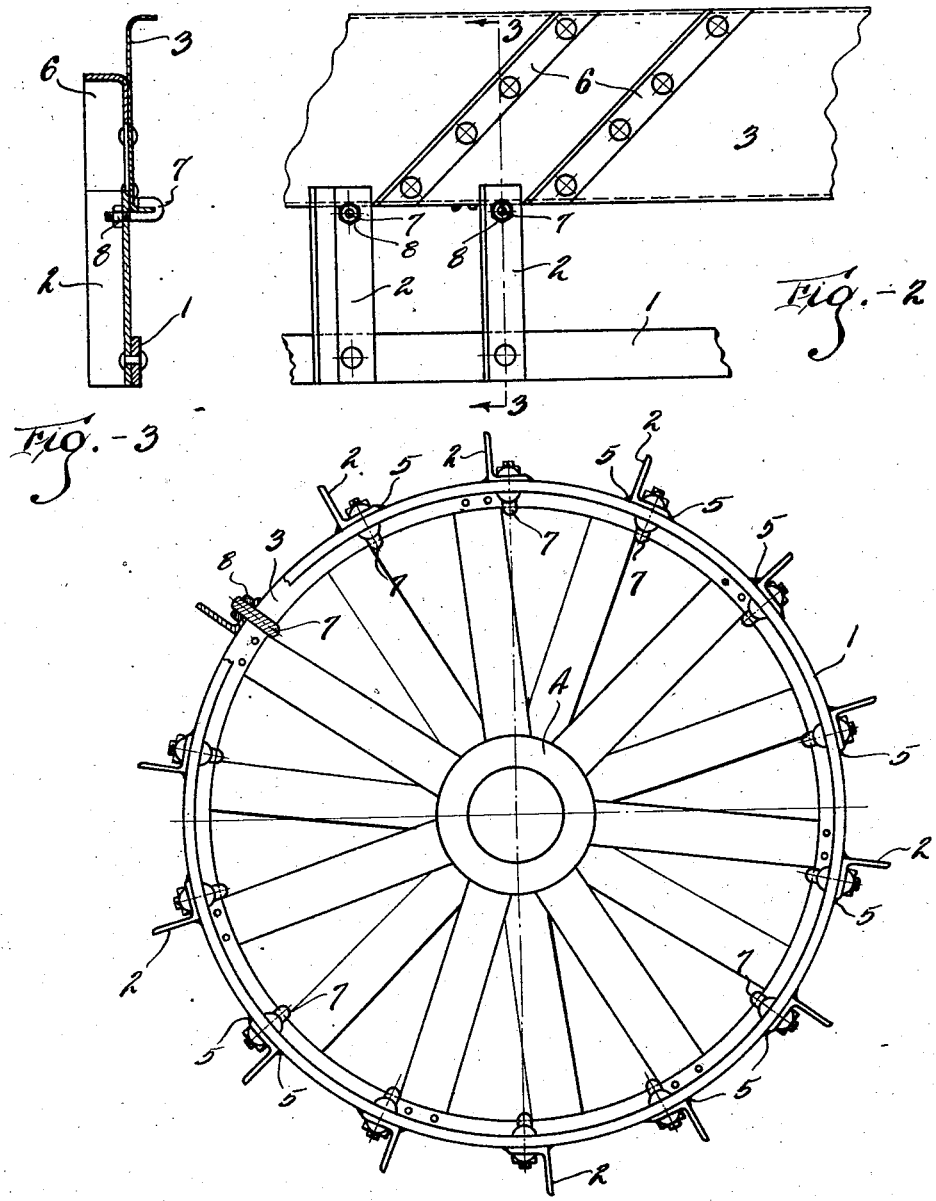
INVENTOR.
Arthur P. Armington
BY Frank R. Higley
ATTORNEY.

Patented Mar. 1, 1927.

1,619,175

UNITED STATES PATENT OFFICE.

ARTHUR P. ARMINGTON, OF WILLOUGHBY, OHIO, ASSIGNOR TO THE EUCLID CRANE & HOIST COMPANY, OF EUCLID VILLAGE, OHIO, A CORPORATION OF OHIO.

AUXILIARY RIM AND MEANS FOR ATTACHING SAME.

Application filed March 24, 1926. Serial No. 97,014.

This invention relates to auxiliary rims adapted for attachment to a wheel such as that of a tractor, for the purposes of increasing the effective tread of the wheel and thereby obtaining a greater bearing surface, increasing the ground gripping means, as well as the weight of the wheel, whereby the traction is improved to take full advantage of the power unit of the tractor; and means for attaching the auxiliary rim to that of the tractor wheel.

It is the object of the present invention to provide an auxiliary rim of an exceedingly simple yet structurally superior design, and adapted to co-operate with the tractor wheel in such a manner as to be readily but firmly secured thereupon by such means as I have provided and which form a part of this invention.

The exact nature and advantages of my invention as generally outlined above, will be readily apparent from the following description taken in connection with the accompanying drawings in which Fig. 1 represents a side view partly in section of a traction wheel with my rim attached in a manner constituting an example of my invention; Fig. 2 is an outer plan view of a portion of the wheel and rim shown in Fig. 1; Fig. 3 is a section along the line 3—3 of Fig. 2.

As appears in the drawings the rim consists essentially of a circular member 1 to which are riveted at intervals short laterally projecting sections of angle iron to form the tread members 2; and upon the free ends of the tread members means for securing them with the rim 3 of the tractor wheel 4.

The circular member 1 is of the same outside diameter as that of the tractor wheel to which the auxiliary rim is to be applied, and the tread members 2 are secured upon it, spaced at intervals, by any convenient means such as the rivets shown; and at least one of the tread members is angularly fixed with respect to the circular member as by welding, shown at 5 in connection with several of the tread members.

The tread of an ordinary tractor wheel for example that of a Fordson tractor is formed with a section as shown in Fig. 3, that is having inwardly extending flanges at the sides of the tread, and spaced projections 6 diagonally extending upon the face of the tread.

According to my invention I make use of the flange of the tractor wheel in securing my auxiliary rim to the wheel, by providing at the free end of each tread member 2 a hook bolt 7 which passes through the tread member, hooks over the rim of the tractor wheel, and is tightened thereupon by means of a nut 8 as appears in the various figures of the drawing. Since the tread member thus secured extends somewhat beyond the edge of the rim of the tractor wheel, and the spokes of the wheel are secured at the rim to the flanges described, obviously it is necessary that the tread members be spaced upon the circular member 1 so that the hook bolts 7 will lie between the spokes, and likewise the tread members 2 will lie between the projections 6 upon the rim of the tractor wheel.

I prefer to make the tread members 2 of such proportions that the contour of their outer extremities will be of the same diameter as that of the extremities of the projections 6, so that when the auxiliary rim is used the result is simply a widened tread upon the tractor wheel.

The hook bolt design is such as to closely fit the flange upon which it is to be secured, and the threaded end is of such length as to when secured, engage the entire threaded area of the securing nut.

It will be noticed also that the position of the bolts in the tread members lies close to and is therefore protected by the projecting portions of the members, and that when in position upon the tractor wheel a further protection is afforded by the adjacent portions of the projections 6.

The weight and proportions of the various parts of my rim will vary somewhat depending upon the tractor to which it is to be applied, and without varying from the principles involved, and I find that in practice the correct proportions for the Fordson tractor are approximately those illustrated.

The construction shown, which exemplifies my invention, provides certain points of superiority.

For example when the tractor must be used in very soft earth the wheels furnished with the tractor are sometimes incapable of taking full advantage of the power available in not being able to supply the necessary traction. It is apparent that by the form of the tread members 2 in effect what might be termed the projecting area of the tread is increased, and this a proper amount to take full advantage of the power available, and a considerable saving results from gaining weight by the circular member of rectangular section, rather than in the tread members of expensive rolled section.

Where the soil is of an adhesive nature such as soft clay the tendency with the tractor wheel alone is to quickly build up a fillet adjacent the projections 6, which adheres to the wheel rim so that in effect the rim loses all means of gripping the earth and traction is almost entirely impossible. Under such conditions my rim with its large open spaces between the tread members allows earth which would otherwise adhere to and nullify the action of the projections, to simply drop through the portions of the rim rising from the ground as the wheel advances in its cycle so that upon reengagement with the ground the full effect of each projection is obtained.

Another advantage of my construction is the ease with which the auxiliary rim may be applied to or removed from the tractor wheel, and the rigid and continuous security of the rim upon the wheel when attached. It is only necessary to slip each hook bolt in turn under the flange of the wheel, and pull up on its nut to firmly secured the rim; and since there is no tendency with my design in service to mutilate or deform any part of the rim, it is as easily removed when desired. Further my rim although of great strength by virtue of its circular member 1, yet on account of the extremely simple construction is comparatively inexpensive of manufacture.

What I claim is:

1. In combination with a flanged tractor wheel, an auxiliary rim secured upon a wheel by hook bolts passing through tread members laterally extending from said rim and engaging the flange of said wheel.

2. In combination with a flanged tractor wheel, an auxiliary rim spaced from said wheel by a plurality of tread members, and secured upon said wheel by hook bolts passing through said members and engaging the flange of said wheel.

3. An auxiliary tractor rim comprising a circular member, tread members laterally extending therefrom, and hook bolts passing through said members and adapted for engagement with a flanged tractor wheel.

Signed by me, this 19th day of March, 1926.

ARTHUR P. ARMINGTON.